United States Patent
Chen (10) Patent No.: US 12,392,962 B2
(45) Date of Patent: Aug. 19, 2025

(54) METHOD FOR INTEGRATION OF ELECTRO-OPTICAL MATERIALS IN A PHOTONIC INTEGRATED CIRCUIT

(71) Applicant: Cisco Technology, Inc., San Jose, CA (US)

(72) Inventor: Long Chen, Marlboro, NJ (US)

(73) Assignee: Cisco Technology, Inc., San Jose, CA (US)

( * ) Notice: Subject to any disclaimer, the term of this patent is extended or adjusted under 35 U.S.C. 154(b) by 235 days.

(21) Appl. No.: 18/189,668

(22) Filed: Mar. 24, 2023

(65) Prior Publication Data

US 2024/0319440 A1    Sep. 26, 2024

(51) Int. Cl.
*G02B 6/136* (2006.01)
*G02B 6/12* (2006.01)
*G02B 6/132* (2006.01)

(52) U.S. Cl.
CPC ......... *G02B 6/136* (2013.01); *G02B 6/12004* (2013.01); *G02B 6/132* (2013.01);
(Continued)

(58) Field of Classification Search
CPC ......... G01M 11/30; G01M 11/35; G02B 6/12; G02B 6/1228; G02B 6/124; G02B 6/13;
(Continued)

(56) References Cited

U.S. PATENT DOCUMENTS 11,841,563 B2 * 12/2023 Chakravarty ........... G02F 1/225
2020/0363693 A1 11/2020 Zou et al.
(Continued)

FOREIGN PATENT DOCUMENTS

| CN | 110703382 A | 1/2020 |
|---|---|---|
| CN | 114460684 A | 5/2022 |
| EP | 4067982 A1 | 5/2022 |

OTHER PUBLICATIONS

Mere Viphretuo et al.: "Design and Fabrication of Hybrid Lithium Niobate Electro-Optic Modulators", 2022 IEEE International Conference on Emerging Electronics (ICEE), IEEE, Dec. 11, 2022 (Dec. 11, 2022), pp. 1-4, XP034342837, DOI: 10.1109/ICEE56203.2022. 10117674.

(Continued)

*Primary Examiner* — John Bedtelyon
(74) *Attorney, Agent, or Firm* — Patterson + Sheridan, LLP (57) ABSTRACT

A method includes providing a sacrificial wafer, contacting the sacrificial wafer to a photonic device wafer, and bonding the sacrificial wafer to the photonic device wafer. The sacrificial wafer includes a substrate and an electro-optical material strip disposed within a dielectric matrix. The photonic device wafer includes a photonic device die, and the electro-optical material strip is disposed proximate to the photonic device die. A photonic device structure includes a photonic device wafer and a sacrificial wafer. The photonic device structure includes a device wafer substrate and a photonic device die fabricated in a device wafer dielectric layer. The sacrificial wafer includes a sacrificial wafer substrate and an electro-optical material strip embedded in a sacrificial wafer dielectric matrix. The sacrificial wafer dielectric matrix is bonded to the device wafer dielectric layer, and the electro-optical material strip is disposed proximate to the photonic device die.

22 Claims, 11 Drawing Sheets

(52) U.S. Cl.
CPC ............... *G02B 2006/1204* (2013.01); *G02B 2006/12047* (2013.01); *G02B 2006/12085* (2013.01); *G02B 2006/12197* (2013.01)

(58) Field of Classification Search
CPC .................. G02B 6/305; G02B 6/122; G02B 2006/1213; G02B 6/132
See application file for complete search history.

(56) References Cited

U.S. PATENT DOCUMENTS

| | | |
|---|---|---|
| 2021/0278738 A1 | 9/2021 | Kumar |
| 2022/0163827 A1 | 5/2022 | Sugiyama |
| 2022/0252913 A1 | 8/2022 | Lo et al. |
| 2022/0413355 A1 | 12/2022 | Umeki et al. |
| 2024/0427082 A1* | 12/2024 | Niu ..................... G02B 6/125 |

OTHER PUBLICATIONS

Extended European Search Report for corresponding European Patent Application No. 24164890.6 dated Aug. 2, 2024.
Jintian Lin et al.: "High-Precision Propagation-Loss Measurement Of Single-Mode Optical Waveguides On Lithium Niobate On Insulator," MDPI, Published Sep. 15, 2019.

* cited by examiner

METHOD FOR INTEGRATION OF ELECTRO-OPTICAL MATERIALS IN A PHOTONIC INTEGRATED CIRCUIT

FIELD

This disclosure relates generally to the field of photonic systems and more particularly relates to a method of fabricating a photonic integrated circuit (PIC) including an electro-optical material such as $LiNbO_3$ thin film for light modulation.

BACKGROUND

Contemporary optical communications and other photonic systems make extensive use of photonic integrated circuits that are advantageously mass-produced in various configurations for various purposes. Such photonic integrated circuits may incorporate a variety of optical components including waveguides and light detection components, along with associated electronics to operate and receive data from the optical components. In some embodiments, additional opto-electrical components may be included to encode information into light for rapid transmission of the information. Some encoding devices may include optical modulators that may modulate one or more characteristics of the light, for example phase, amplitude, or polarization. A variety of electro-optical materials may be used to this effect.

$LiNbO_3$ is one such electro-optical material that may be used as an optical modulator. There are substantial benefits of using thin film $LiNbO_3$ as an optical modulator owning to its high radio frequency (RF) bandwidth and low optical insertion loss. There are also substantial benefits of incorporating such modulators onto silicon photonics platform to allow integration with other photonic components and circuits. Existing supplies of $LiNbO_3$ wafers or thin-film $LiNbO_3$ wafers typically have 4-inch or 6-inch diameters, while silicon photonics wafers typically have 8-inch or 12-inch diameters. Further, for most photonic integrated circuits, only part of the circuits requires the $LiNbO_3$ material. As a result, the $LiNbO_3$ wafers or thin-film $LiNbO_3$ wafers can be cleaved into individual $LiNbO_3$ chips, which may be placed over the PIC dies fabricated on a separate photonic device wafer and bonded thereto.

Because $LiNbO_3$ is a crystalline material, it may be understood that the processing of $LiNbO_3$ and fabrication of $LiNbO_3$ wafers or thin-film $LiNbO_3$ wafers may include materials and processes not typically found in CMOS or photonic device fabrication facilities. Bonding the individual $LiNbO_3$ crystal films directly to the photonic device wafers using die-to-wafer bonding techniques may pose challenges to facilities designed for typical CMOS or photonic device manufacture. $LiNbO_3$ die-to-wafer bonding may require additional temperature controls to prevent of wafer warpage, processes to remove chip substrates, and processes to etch the $LiNbO_3$ crystals.

It would therefore be useful to develop a method for integrating Electro-optical materialfilms onto photonic device wafers that can readily be included in the process flow of typical photonic device fabrication facilities.

SUMMARY

In part, in one aspect, the disclosure relates to a method that includes providing a sacrificial wafer, contacting the sacrificial wafer to a photonic device wafer, and bonding the sacrificial wafer to the photonic device wafer. The sacrificial wafer may include a substrate and an electro-optical material strip disposed within a dielectric matrix deposited over the substrate. The photonic device wafer includes a photonic device die. The electro-optical material strip may be disposed proximate to the photonic device die.

In part, in one aspect, the electro-optical material strip comprises essentially $LiNbO_3$.

In part, in one aspect, the electro-optical material strip comprises essentially $BaTiO_3$.

In part, in one aspect, providing a sacrificial wafer includes placing an electro-optical material chiplet on a dielectric layer of the sacrificial wafer, bonding the electro-optical material chiplet to the dielectric layer of the sacrificial wafer, fabricating an electro-optical material strip from the electro-optical material chiplet, depositing a second dielectric layer over the sacrificial wafer and the electro-optical material strip thereby embedding the electro-optical material strip in the dielectric matrix, and planarizing the dielectric matrix of the sacrificial wafer.

In part, in one aspect, placing the electro-optical material chiplet on the dielectric layer of the sacrificial wafer may include using a pick-and-place device or a wafer bonding device.

In part, in one aspect, the electro-optical material chiplet may include an electro-optical material thin film deposited over a chiplet dielectric layer disposed over a chiplet substrate.

In part, in one aspect, placing the electro-optical material chiplet on the dielectric layer of the sacrificial wafer may include placing the electro-optical material thin film of the electro-optical material chiplet on the dielectric layer of the sacrificial wafer.

In part, in one aspect, the method may further include removing the chiplet substrate and etching the electro-optical material thin film thereby forming the electro-optical material strip.

In part, in one aspect, placing the electro-optical material chiplet on the dielectric layer of the sacrificial wafer may include placing an electro-optical material die on the dielectric layer of the sacrificial wafer.

In part, in one aspect, the electro-optical material die may include a thick electro-optical material film, an electro-optical material thin film, and a pre-implanted damage layer therebetween. In part, in one further aspect placing the electro-optical material die on the dielectric layer of the sacrificial wafer may include placing the electro-optical material thin film on the dielectric layer of the sacrificial wafer.

In part, in one aspect, the method may further include cleaving the electro-optical material die to remove the thick electro-optical material film and etching the electro-optical material thin film thereby forming the electro-optical material strip.

In part, in one aspect, the sacrificial wafer further includes an optical waveguide disposed proximate to the electro-optical material strip.

In part, in one aspect, providing a sacrificial wafer may include depositing an optical waveguide material above a dielectric layer of the sacrificial wafer, patterning the optical waveguide material thereby fabricating the optical waveguide, depositing an additional dielectric layer over the optical waveguide and the dielectric material of the sacrificial wafer, planarizing a surface of the additional dielectric layer, placing an electro-optical material chiplet on the planarized surface of the sacrificial wafer proximate to the optical waveguide, and bonding the electro-optical material chiplet to the planarized surface of the sacrificial wafer. In part, in one further aspect, the dielectric layer of the sacrificial wafer may be disposed over the substrate.

In part, in one aspect, the sacrificial wafer further may include an electrode disposed proximate to the electro-optical material strip.

In part, in one aspect, providing a sacrificial wafer may include pattern etching a dielectric layer of the sacrificial wafer, depositing an electrode material in the etched pattern of the dielectric layer of the sacrificial wafer, planarizing a surface comprising the electrode material in the etched pattern and the dielectric layer of the sacrificial wafer, depositing an additional dielectric layer over the electrode material in the etched pattern and the dielectric material, placing an electro-optical material chiplet on the additional dielectric layer proximate to the electrode material in the etched pattern, and bonding the electro-optical material chiplet to the additional dielectric layer. In part, in one further aspect, the dielectric layer of the sacrificial wafer may be disposed over the substrate.

In part, in one aspect, the method may further include removing the substrate, thereby exposing a bottom surface of the dielectric matrix of the sacrificial wafer.

In part, in one aspect, the disclosure relates a photonic device structure including a photonic device wafer and a sacrificial wafer. In part, in one further aspect, the photonic device wafer may include a device wafer substrate and a photonic device die fabricated in a device wafer dielectric layer disposed over the device wafer substrate. In part, in one further aspect, the sacrificial wafer may include a sacrificial wafer substrate and an electro-optical material strip embedded in a sacrificial wafer dielectric matrix. In part, in one further aspect, the sacrificial wafer dielectric matrix may be bonded to the device wafer dielectric layer and the electro-optical material strip may be disposed proximate to the photonic device die.

In part, in one aspect, the electro-optical material strip comprises essentially $LiNbO_3$.

In part, in one aspect, the electro-optical material strip comprises essentially $BaTiO_3$. In part, in one aspect, the electro-optical material strip is 200 nm to 600 nm thick.

In part, in one aspect, the sacrificial wafer further includes an electrode proximate to the electro-optical material strip.

In part, in one aspect, the sacrificial wafer further includes an optical waveguide proximate to the electro-optical material strip.

Although, the disclosure relates to different aspects and embodiments, it is understood that the different aspects and embodiments disclosed herein can be integrated, combined, or used together as a combination system, or in part, as separate components, devices, and systems, as appropriate. Thus, each embodiment disclosed herein can be incorporated in each of the aspects to varying degrees as appropriate for a given implementation. Further, the various apparatus, optical elements, passivation coatings/layers, optical paths, waveguides, splitters, couplers, combiners, electro-optical devices, electrodes, inputs, outputs, ports, channels, components and parts of the foregoing disclosed herein can be used comprising laser, laser-based communication system, waveguide, fiber, transmitter, transceiver, receiver, and other devices and systems without limitation.

BRIEF DESCRIPTION OF THE FIGURES

Unless specified otherwise, the accompanying drawings illustrate aspects of the innovations described herein. Referring to the drawings, wherein like numerals refer to like parts throughout the several views and this specification, several embodiments of presently disclosed principles are illustrated by way of example, and not by way of limitation. The drawings are not intended to be to scale. A more complete understanding of the disclosure may be realized by reference to the accompanying drawings in which.

DETAILED DESCRIPTION

In one aspect, the present disclosure provides an apparatus and method comprising a sacrificial wafer comprising a substrate and a strip of electro-optical material disposed within a dielectric matrix deposited over the substrate. Electro-optical materials are those in which an applied electric field may change the optical properties of the material. In some non-limiting cases, such electro-optical materials may be those that exhibit the Pockels effect. In one embodiment, the electro-optical material is $LiNbO_3$. In another embodiment, the electro-optical material is $BaTiO_3$. Additional examples of electro-optical materials may include, without limitation, compound semiconductors such as InGaAsP. The sacrificial wafer is contacted to and bonded to a photonic device wafer. In one embodiment, the electro-optical material is for use in optical waveguides, optical modulators, and for various other linear and non-linear optical applications.

As disclosed above, there may be several challenges to integrating Electro-optical material thin films into photonic device dies during fabrication. One solution may be for a photonic device fabrication facility to receive a pre-processed wafer composed of Electro-optical material strips embedded in a dielectric matrix. The embedded strip may then be readily incorporated into the process flow for the manufacture of the photonic devices. The pre-processed wafer containing an electro-optical material (hereafter, the sacrificial wafer containing an electro-optical material) may be obtained from a facility having the required experience, equipment, and materials for manufacturing and handling the electro-optical material, that are lacking at a photonic device fabrication facility. The sacrificial wafer containing can be used to integrate the electro-optical material strips into the photonic devices without requiring direct manipulation of the electro-optical material strips. This may save on process time and cost, and not require additional resources necessary for direct handling of the electro-optical material strips. Disclosed herein are various embodiments of a sacrificial wafer containing electro-optical material, methods for its fabrication, and use of the sacrificial wafer containing an electro-optical material as part of the process flow for manufacturing a photonic device.

Figure 1:
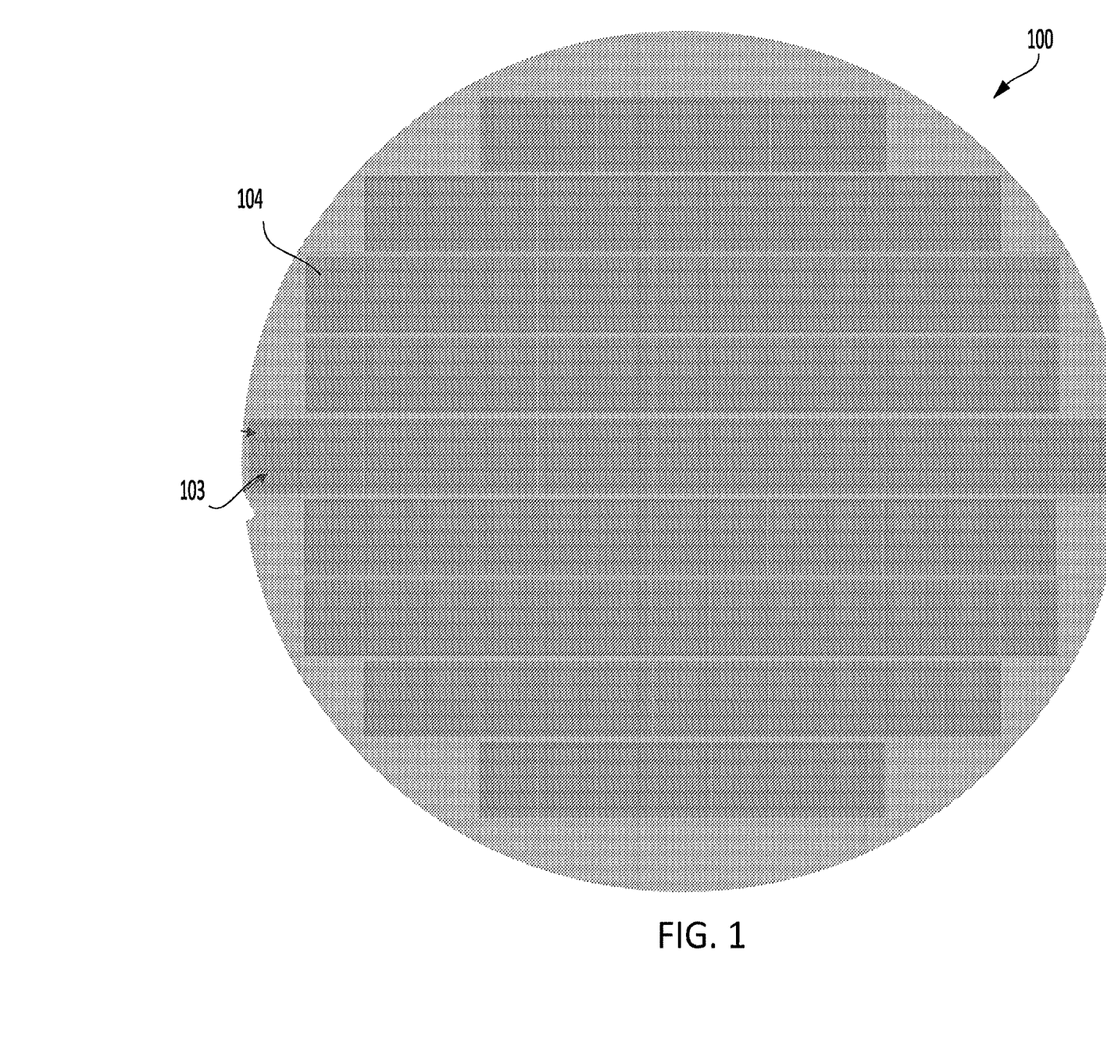
FIG. 1 is a planar view of an opto-electronic wafer composed of multiple opto-electronic devices, according to an exemplary embodiment of the disclosure.
Figure 6:
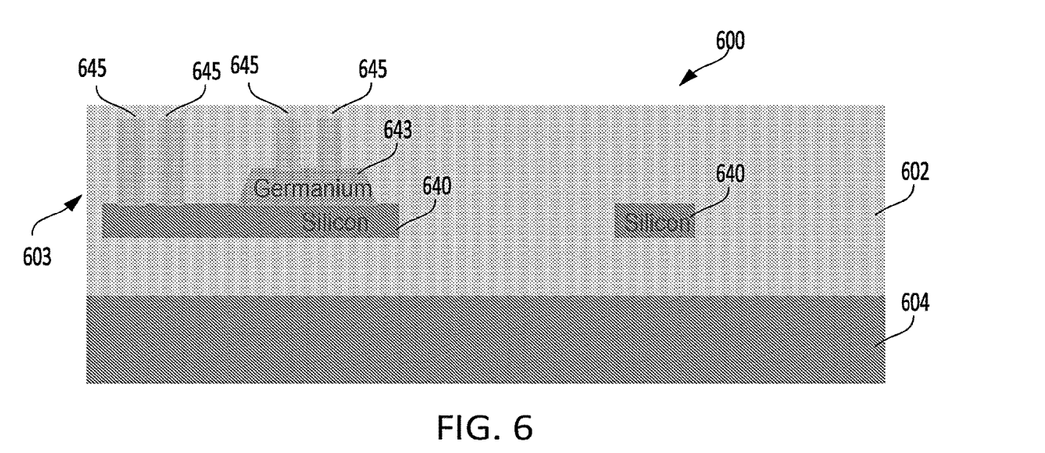
FIG. 6 depicts a sectional view of a first embodiment of a wafer composed of photonic device dies, according to an exemplary embodiment of the disclosure.

FIG. 1 illustrates a top plan view of a photonic device wafer 100 composed of multiple photonic device dies 103, in which each photonic device die 103 is overlaid with a group of electro-optical material strips 104. In some aspects, each electro-optical material strip 104 can be part of an electro-optical phase shifter or modulator. In some aspects, each electro-optical material strip 104 may have a thickness ranging between about 200 nm and about 600 nm, for example about 330 nm. Each electro-optical material strip 104 may also have a length between about 500 µm and about 2 cm. The photonic device wafer 100 may include a substrate, such as Si, and the photonic device dies 103 may be disposed in a photonic device wafer dielectric matrix. FIG. 6, described further below, further discloses aspects of the photonic device die 103 disposed in the photonic device wafer dielectric matrix. In some aspects, the electro-optical material strip 104 may be overlaid on a single photonic device die 103. In some other aspects, a single electro-optical material strip 104 may be overlaid on a number of neighboring photonic device dies 103.

Figure 2:
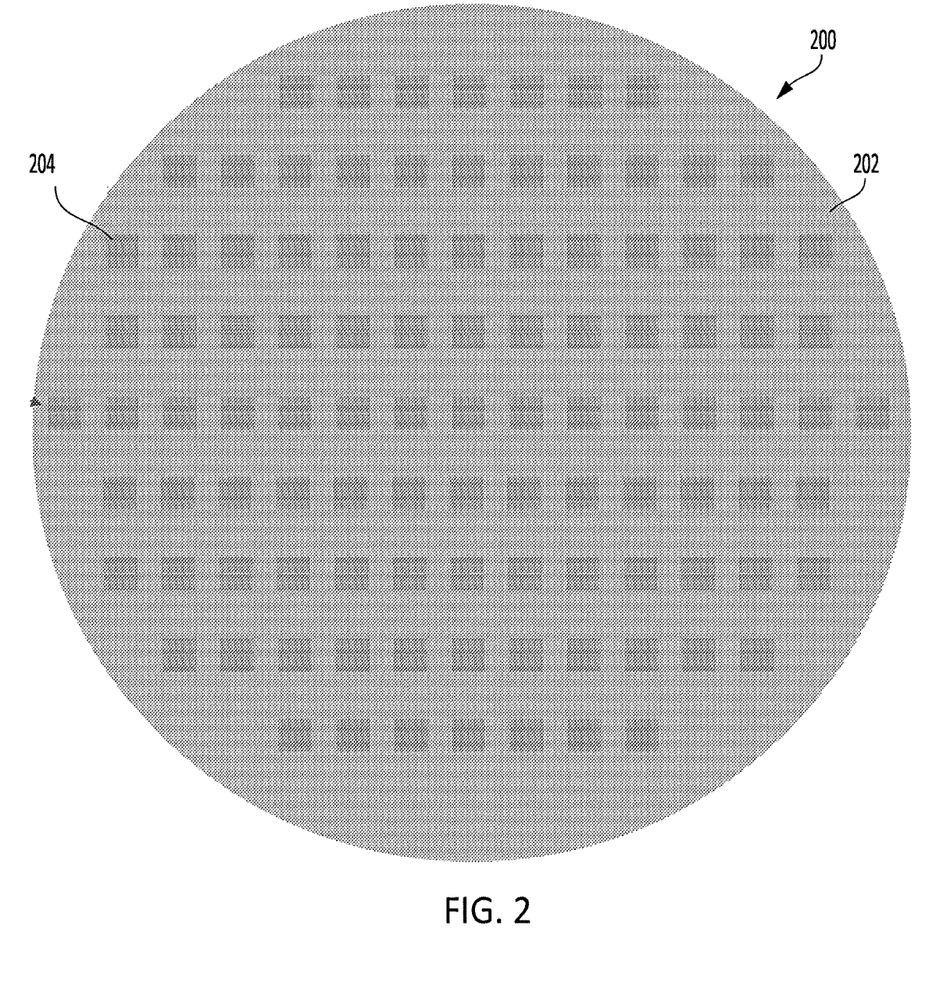
FIG. 2 is a planar view of a sacrificial wafer composed of multiple Electro-optical material strips, according to an exemplary embodiment of the disclosure.

As disclosed above, there may be several processing issues for placing and bonding individual electro-optical material strips 104 directly over the photonic device dies 103. To overcome these issues, disclosed herein is the use of a pre-fabricated sacrificial wafer, composed of multiple electro-optical material strips embedded in a dielectric matrix. The sacrificial wafer may include the electro-optical material strips positioned in such a manner that the sacrificial wafer containing the electro-optical material may be inverted, placing one or multiple embedded electro-optical material strips proximate to each of the photonic device dies 103. FIG. 2 illustrates a top plan view of an example of a sacrificial electro-optical material wafer 200. The sacrificial wafer 200 includes multiple electro-optical material strips 204 embedded in a dielectric matrix 202. In some aspects, the dielectric matrix 202 may be fabricated from $SiO_2$.

FIGS. 3A-3I illustrate some non-limiting examples of a cross-section through the sacrificial wafer containing electro-optical material. While simplicity of fabrication may suggest that all of the embedded electro-optical material strips incorporate the same features across a single sacrificial wafer, the sacrificial wafer may include embedded electro-optical material strips having a variety of geometries. The sacrificial wafer may also incorporate other components besides the embedded electro-optical material strips as illustrated in FIGS. 3A-3I.

Figure 3A:
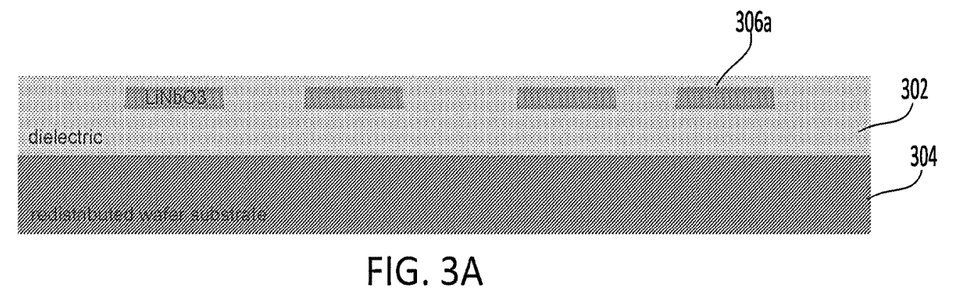
FIG. 3A-FIG. 3I are sectional views of various embodiments of the sacrificial wafer depicted in FIG. 2, according to an exemplary embodiment of the disclosure.

FIG. 3A illustrates a cross-section through a sacrificial wafer having only electro-optical material strips 306a. Each of electro-optical material strips 306a may be imbedded in a dielectric matrix 302. Dielectric matrix 302 may surround each of electro-optical material strips 306a leaving a thin dielectric layer of about 20 nm to about 200 nm covering each of electro-optical material strips 306a. Dielectric matrix 302 may be disposed over a sacrificial wafer substrate 304. The methods for fabricating the sacrificial wafer containing the electro-optical material are further disclosed below, with reference to FIGS. 4A-4D and FIGS. 5A-5D.

Figure 3B:
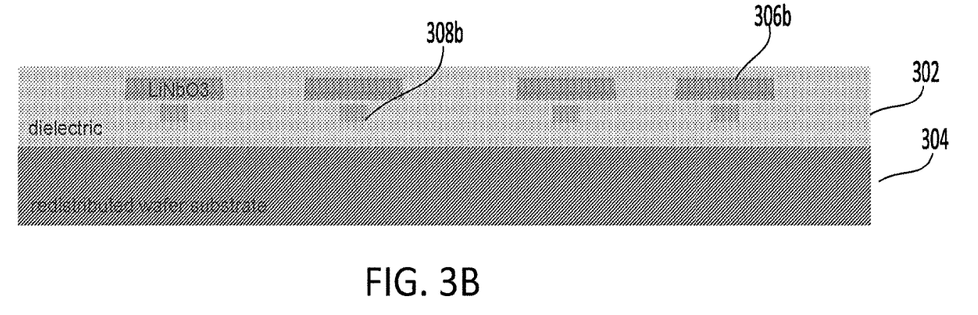
Figure 3C:
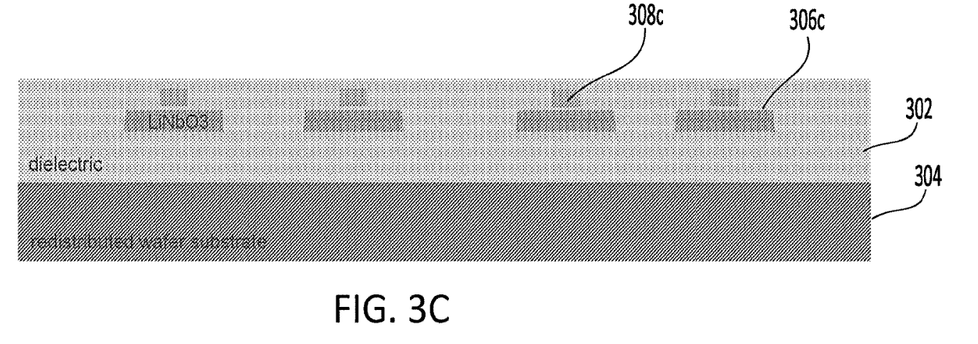

FIGS. 3B and 3C illustrate cross-sections through a sacrificial wafer having only electro-optical material strips and waveguides. The waveguides may be disposed proximate to the electro-optical material strips so that the waveguides may be optically coupled to the electro-optical material strips. FIG. 3B illustrates waveguides 308b, also embedded in dielectric matrix 302, disposed between electro-optical material strips 306a and substrate 304. Waveguides 308b may be fabricated from any material having appropriate light transmitting properties, such as Si or SiN. In one aspect, a sacrificial wafer containing electro-optical material illustrated in FIG. 3B may be fabricated by depositing the waveguide material on top of the dielectric material, patterning the waveguide material, depositing additional dielectric material over the waveguide material and dielectric layer, and then planarizing the surface. In one aspect, the vertical separation between the waveguides 308b and the electro-optical material strips 306a is less than 1 micrometer. In another aspect, it is less than 0.5 micrometer. In another aspect, it is less than 0.2 micrometer. The methods for embedding electro-optical material strips 306b into the sacrificial wafer of FIG. 3B are further disclosed below, with reference to FIGS. 4A-4D and FIGS. 5A-5D.

FIG. 3C illustrates waveguides 308c, also embedded in dielectric matrix 302, disposed between electro-optical material strips 306c and an exposed surface of dielectric matrix 302. Waveguides 308c may be fabricated from any material having appropriate light transmitting properties, such as Si or SiN. In one aspect, a sacrificial wafer containing an electro-optical material illustrated in FIG. 3C may be fabricated by starting with the sacrificial wafer containing an electro-optical material illustrated in FIG. 3A, depositing the waveguide material and patterning it, depositing additional dielectric material over the waveguide material and dielectric material, and then planarizing the surface. The vertical separation between the waveguides 308c and the electro-optical material strips 306c could be similar as the case in FIG. 3B.

Figure 3D:
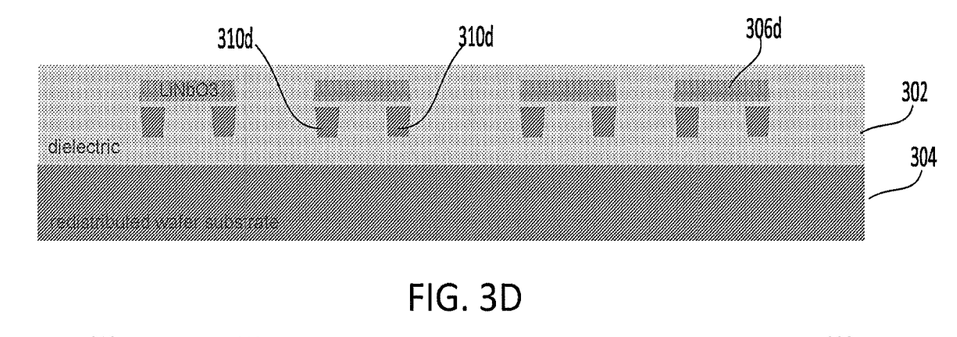
Figure 3E:
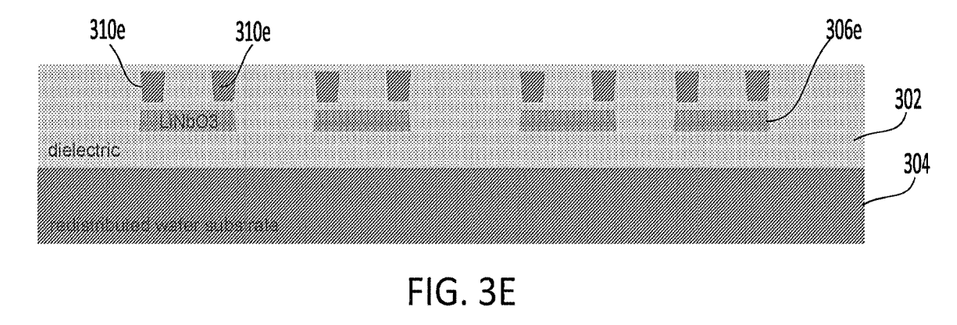

FIGS. 3D and 3E illustrate cross-sections through a sacrificial wafer having only electro-optical material strips and electrodes. The electrodes may be disposed proximate to the electro-optical material strips. In this geometry, a voltage placed across the electrodes may alter the material properties of the electro-optical material strips, allowing the electro-optical material strips to modulate light passing therethrough. FIG. 3D illustrates electrodes 310d, also embedded in dielectric matrix 302, disposed between electro-optical material strips 306d and substrate 304. Electrodes 310d may be fabricated from any material having appropriate electrical conducting properties, such as aluminum, copper, and gold. In one aspect, a sacrificial wafer containing the electro-optical material illustrated in FIG. 3D may be fabricated by pattern etching a dielectric layer of a clean wafer, depositing the electrode material in the etched pattern, planarizing the surface, and depositing additional dielectric material over the electrode material and dielectric layer. In one aspect, the vertical separation between the electrodes 3 and the electro-optical material strips 306d is less than 1 micrometer. In another aspect, it is less than 0.5 micrometer. In another aspect, it is less than 0.2 micrometer. The methods for embedding electro-optical material strips 306d into the sacrificial wafer of FIG. 3D are further disclosed below, with reference to FIGS. 4A-4D and FIGS. 5A-5D.

FIG. 3E illustrates electrodes 310e, also embedded in dielectric matrix 302, disposed between electro-optical material strips 306e and an exposed surface of dielectric matrix 302. Electrodes 310e may be fabricated from any material having appropriate electrical conducting properties, such as aluminum, copper, and gold. In one aspect, a sacrificial wafer containing the electro-optical material illustrated in FIG. 3E may be fabricated by starting with the sacrificial wafer containing the electro-optical material illustrated in FIG. 3A, depositing a dielectric coating and pattern etching the dielectric coating covering electro-optical material strips 306c, depositing the electrode material in the etched pattern, planarizing the surface, and depositing additional dielectric material over the electrode material and dielectric material. The vertical separation between the electrodes 310e and the electro-optical material strips 306e could be similar as the case in FIG. 3D.

Figure 3F:
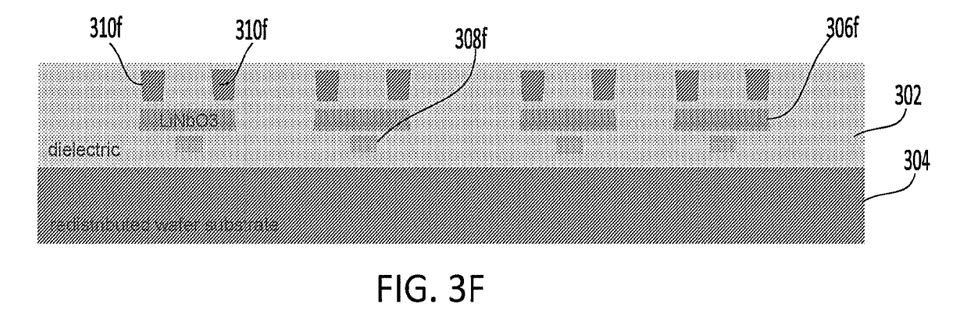
Figure 3G:
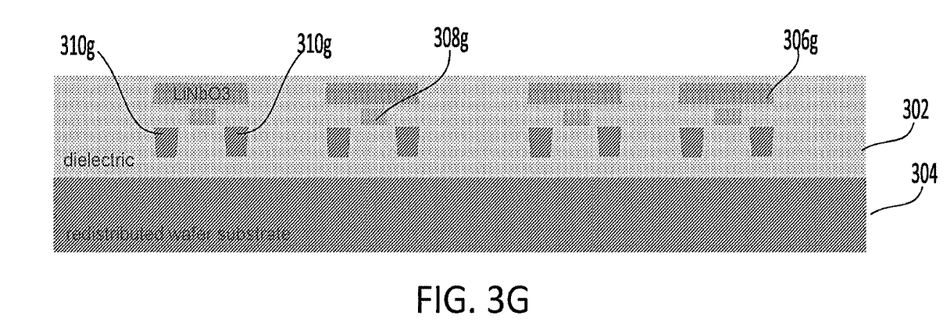
Figure 3H:
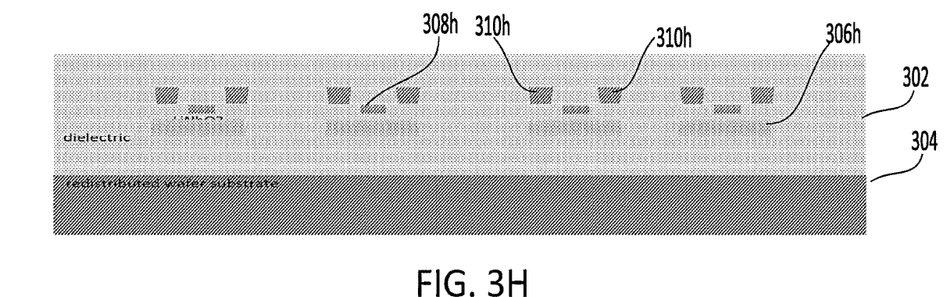
Figure 3I:
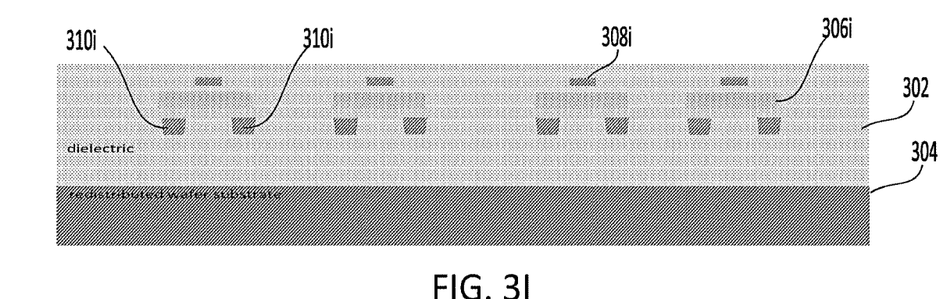

FIGS. 3F-3I illustrate sacrificial wafers containing the electro-optical material having various combinations of electro-optical material strips, waveguides, and electrodes. In all of these figures, the waveguides and electrodes are disposed proximate to the electro-optical material strips, with vertical separations as disclosed above. In this manner, light from the waveguides may be modulated by passing through the electro-optical material strips. Further, the electrodes may be sufficiently close to the electro-optical material strips so that voltages applied to the electrodes may cause the electro-optical material strips to modulate the light passing therethrough. Thus, FIG. 3F illustrates a sacrificial wafer containing the electro-optical material having electrodes 310f disposed between electro-optical material strips 306f and an exposed surface of dielectric matrix 302. FIG. 3F additionally illustrates waveguides 308f disposed between electro-optical material strips 306f and substrate 304. FIG. 3G illustrates waveguides 308g and electrodes 310g disposed between electro-optical material strips 306g and substrate 304. FIG. 3H illustrates waveguides 308h and electrodes 310h disposed between electro-optical material strips 306h and an exposed surface of dielectric matrix 302. FIG. 3I illustrates a sacrificial wafer containing electro-optical material having electrodes 310i disposed between electro-optical material strips 306i and substrate 304. FIG. 3I additionally illustrates waveguides 308i disposed between electro-optical material strips 306i and an exposed surface of the dielectric matrix 302. The embodiments of sacrificial wafers containing the electro-optical material depicted in FIGS. 3F-3I may be fabricated according to any of the methods disclosed above in conjunction with the methods disclosed according to FIGS. 4A-4D, and FIGS. 5A-5D, disclosed below.

FIGS. 4A-4D illustrate one method for fabricating a sacrificial wafer containing the electro-optical material. Although electrodes and waveguides are not included in these figures, the method of fabricating the sacrificial wafer containing the electro-optical material may readily be extended to incorporate these elements, as discussed above with respect to FIGS. 3B-3I.

Figure 4A:
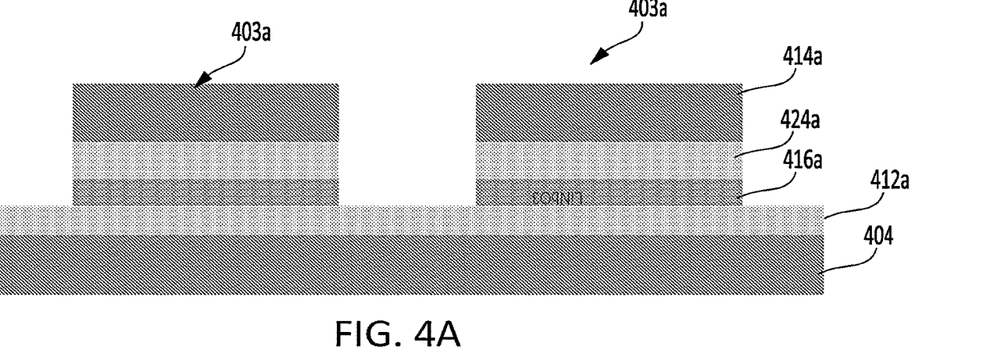
FIG. 4A-FIG. 4D depict a first embodiment of process steps for fabricating the sacrificial wafer depicted in at least FIG. 3A, according to an exemplary embodiment of the disclosure.

FIG. 4A illustrates placement of electro-optical material chiplets 403a on a clean wafer comprising substrate 404 and overlaying dielectric layer 412a. In some aspects, electro-optical material chiplets 403a may be placed on the clean wafer using a pick-and-place device. electro-optical material chiplets 403a may be placed on the clean wafer using a wafer bonding device. In another aspect, In some aspects, a chiplet may be a semiconductor component part of a processing module that makes up a larger integrated circuit. Chiplets enable the use of multiple smaller integrated circuit components to make up a larger integrated circuit, such as for example, a PIC. In some aspects, substrate 404 may be composed of Si and dielectric layer 412a may be composed of $SiO_2$. Chiplets 403a may be fabricated from a thin film electro-optical material wafer which consists of an electro-optical material thin film (416a) sitting on top of a dielectric layer (424a, for example, $SiO_2$) further disposed on a substrate (414a, for example, silicon or glass or quartz). In some non-limiting examples, chiplets 403a might have a thin layer of dielectric such as $SiO_2$ on top of the electro-optical material thin film as the bonding interface. Chiplets 403a may be placed on clean wafer dielectric layer 412a having electro-optical material thin films 416a placed on and bonded to dielectric layer 412a. In some non-limiting examples, chiplets 403a may be bonded to dielectric layer 412a using die-to-wafer bonding techniques. In some aspects, chiplets 403a may have a size of around 1 mm to around 10 mm, and the clean wafer may have an overall diameter of about 200 mm to about 300 mm.

Figure 4B:
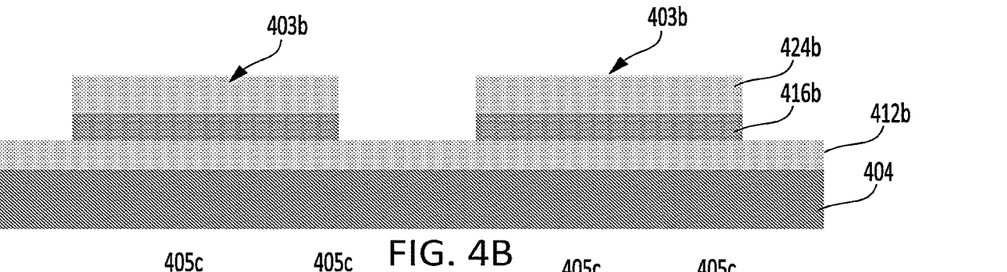

FIG. 4B illustrates chiplets 403b after the removal of chiplet substrate (see 414a in FIG. 4A). In some non-limiting examples, chiplet substrate 414a may be removed by using grinding, dry etching, or wet etching techniques. The remainder of chiplets 403b may be composed of electro-optical material thin film 416b and residual chiplet dielectric layer 424b. Additional dielectric material may be deposited over electro-optical material chiplets 403b and overlaying dielectric layer 412b. The resulting structure may be further planarized.

Figure 4C:
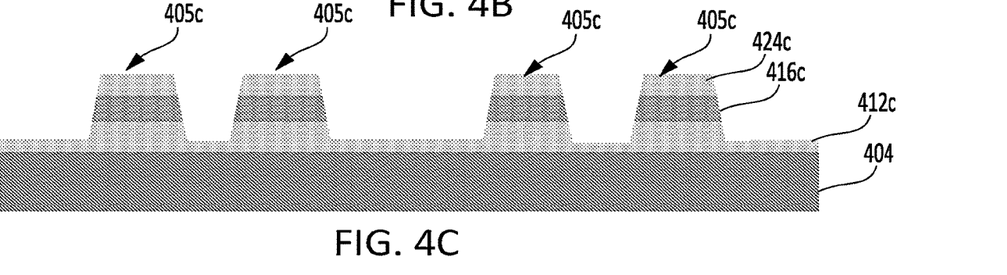

FIG. 4C illustrates the patterning of bonded chiplets 403b (from FIG. 4B) into electro-optical material strips 405c. One or more electro-optical material strips 405c may be fabricated from each chiplet 403b. Patterning is a process by which exposed features on a wafer may be shaped into specific geometries, for example, electro-optical material strips 405c. Some examples of patterning processes may include lithography, such as photolithography, or etching, such as wet or dry etching. Each electro-optical material strip 405c may be composed of a portion of residual chiplet dielectric layer 424c and electro-optical material thin film 416c. Overlaying dielectric layer 412c may also be patterned and thinned.

Figure 4D:
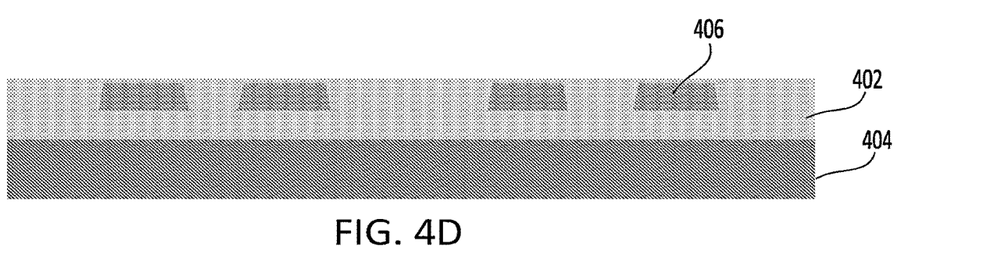

FIG. 4D illustrates the final sacrificial wafer composed of embedded electro-optical material strips 406 fabricated from electro-optical material thin films 416c embedded in dielectric matrix 402 disposed over substrate 404. The structure depicted in FIG. 4C may be further processed by growing an additional dielectric layer over the top of electro-optical material strips 405c along with overlaying dielectric layer 412c until electro-optical material thin films 416c are completely covered and surrounded by the additional dielectric layer (the dielectric matrix 402). The top surface of the structure may be planarized until a top dielectric surface of the sacrificial wafer covers electro-optical material thin films 416 by about 20 nm to about 200 nm.

Although the method disclosed above and illustrated in FIGS. 4A-4D depict the sacrificial wafer illustrated in FIG. 3A, it may be recognized that additional structures, such as waveguide and electrodes (illustrated in FIGS. 3B-3I) may be fabricated in the sacrificial wafer containing the electro-optical material. The disclosures above, with regards to FIGS. 3B and 3I, present exemplary methods in which such waveguide and electrodes may be fabricated in the sacrificial wafer, as further disclosed above.

FIGS. 5A-5D illustrate a second method for fabricating a sacrificial wafer containing the electro-optical material. Although electrodes and waveguides are not included in these figures, again, the method of fabricating the sacrificial wafer may readily be extended to incorporate these elements, as discussed above with respect to FIGS. 3B-3I.

Figure 5A:
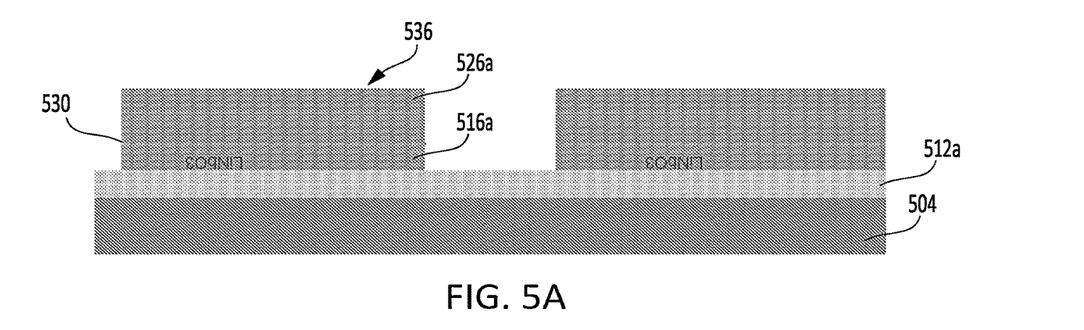
FIG. 5A-FIG. 5D depict a second embodiment of process steps for fabricating the sacrificial wafer depicted in at least FIG. 3A, according to an exemplary embodiment of the disclosure.

FIG. 5A illustrates placement of electro-optical material chiplets 536 on a clean wafer comprising substrate 504 and overlaying dielectric layer 512a. In some aspects, electro-optical material chiplets 536 may be placed on the clean wafer using a pick-and-place device. In some aspects, electro-optical material chiplets 536 may be placed on the clean wafer using a wafer bonding device. In some aspects, substrate 504 may be composed of Si and dielectric layer 512a may be composed of $SiO_2$. Electro-optical material chiplets 536 may be fabricated from an electro-optical material die. Electro-optical material chiplets 536 may also have a pre-implanted damage layer 530 disposed about 500 nm to about 1 μm from one surface of electro-optical material chiplets 536. In one non-limiting example, pre-implanted damage layer 530 may be composed of a layer of hydrogen and/or helium ions implanted within a surface of electro-optical material chiplets 536. Electro-optical material chiplets 536 may thus be composed of electro-optical material thin film 516a and a thick electro-optical material film 526a separated by pre-implanted damage layer 530. It may be understood that electro-optical material thin film 516a may be about 500 nm to about 1 μm thick. Electro-optical material chiplets 536 may be placed on clean wafer dielectric layer 512a having electro-optical material chiplets 536 placed on and bonded to dielectric layer 512a. In particular, electro-optical material thin film 516a of electro-optical material chiplets 536 may be placed in contact with dielectric layer 512a. In some non-limiting examples, electro-optical material chiplets 536 may be further bonded to dielectric layer 512a using die-to-wafer bonding techniques. In some aspects, electro-optical material chiplets 536 may have a size of around 1 mm to around 10 mm, and the clean wafer may have an overall diameter of about 200 mm to about 300 mm.

Figure 5B:
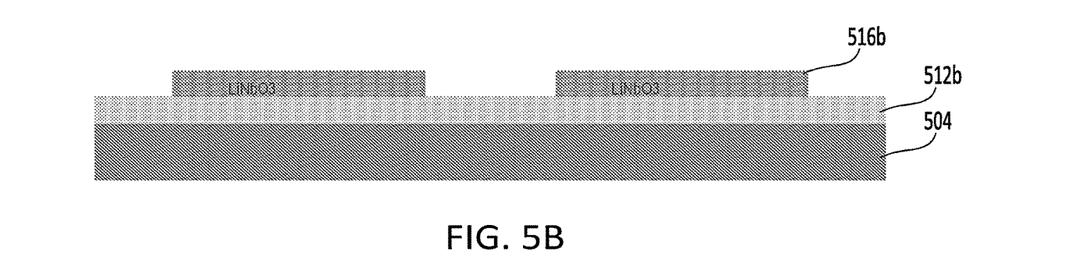

FIG. 5B illustrates electro-optical material thin film 516b after the removal of thicker electro-optical material film 526a. Thick electro-optical material film 526a may be removed from electro-optical material thin films 516b by cleaving electro-optical material chiplets 536 at pre-implanted damage layer 530. In one non-limiting example, the clean wafer including electro-optical material chiplets 536 may be heated, thereby causing the layer of hydrogen or helium gas to expand and fracture the crystal structure of electro-optical material chiplets 536. In this manner, thick electro-optical material film 526a may be removed leaving only electro-optical material thin films 516b bonded to overlaying dielectric layer 512b. The resulting structure may be further planarized to smooth the exposed surface of thin electro-optical material films 516b.

Figure 5C:
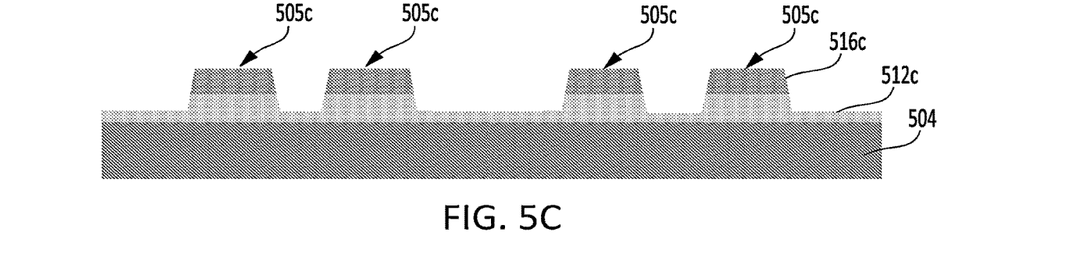

FIG. 5C illustrates the patterning of bonded electro-optical material thin films 516b (from FIG. 5B) into electro-optical material strips 505c. One or more electro-optical material strips 505c may be fabricated from each electro-optical material thin film 516b. Patterning is a process by which exposed features on a wafer may be shaped into specific geometries, for example, electro-optical material strips 505c. Some examples of patterning processes may include lithography, such as photolithography, or etching, such as wet or dry etching. Each electro-optical material strip 505c may be composed of a portion of electro-optical material layer 516c. Overlaying dielectric layer 512c may also be etched.

Figure 5D:
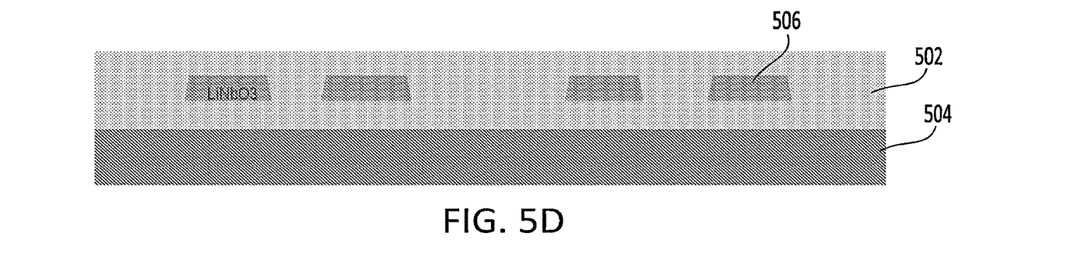

FIG. 5D illustrates the final sacrificial wafer composed of electro-optical material strips 506 embedded in dielectric matrix 502 disposed over substrate 504. The structure depicted in FIG. 5C may be further processed by depositing an additional dielectric layer over the top of electro-optical material strips 516c along with overlaying dielectric layer 512c until electro-optical material strips 516c are completely covered and surrounded by the additional dielectric layer. The top surface of the structure may be planarized until a top dielectric surface of the sacrificial wafer covers embedded electro-optical material strips 506 by about 20 nm to about 200 nm.

Although the method disclosed above and illustrated in FIGS. 4A-4D depict the sacrificial wafer containing electro-optical material illustrated in FIG. 3A, it may be recognized that additional structures, such as waveguide and electrodes (illustrated in FIGS. 3B-3I) may be fabricated in the sacrificial wafer. The disclosures above, with regards to FIGS. 3B and 3I, present exemplary methods in which such waveguide and electrodes may be fabricated in the sacrificial electro-optical material wafer, as disclosed above.

FIG. 6 illustrates a cross-sectional view of an exemplary photonic device wafer 600. Photonic device wafer 600 may be composed of a device wafer substrate 604 over which a device wafer dielectric layer 602 is deposited. In some aspects, device wafer substrate 604 may be composed of silicon. In some aspects, device wafer dielectric layer 602 may be fabricated of $SiO_2$. Photonic device wafer 600 may be composed of multiple photonic device dies 603. Some non-limiting components of the multiple photonic device dies 603 may include waveguides 640, photodiodes 643, and one or more electrodes 645 to conduct control signals to or receive electrical output signals from the photonic device dies 603. Non-limiting examples of waveguides 640 may be fabricated for Si, SiN or other optically high transparency materials. In one non-limiting example, photodiodes 643 may be composed of Ge. Electrodes 645 may be fabricated from tungsten, aluminum, copper, or similar metals or conductive materials. Alternatively, such electrodes can be added after the bonding of the sacrificial wafer.

Figure 7:
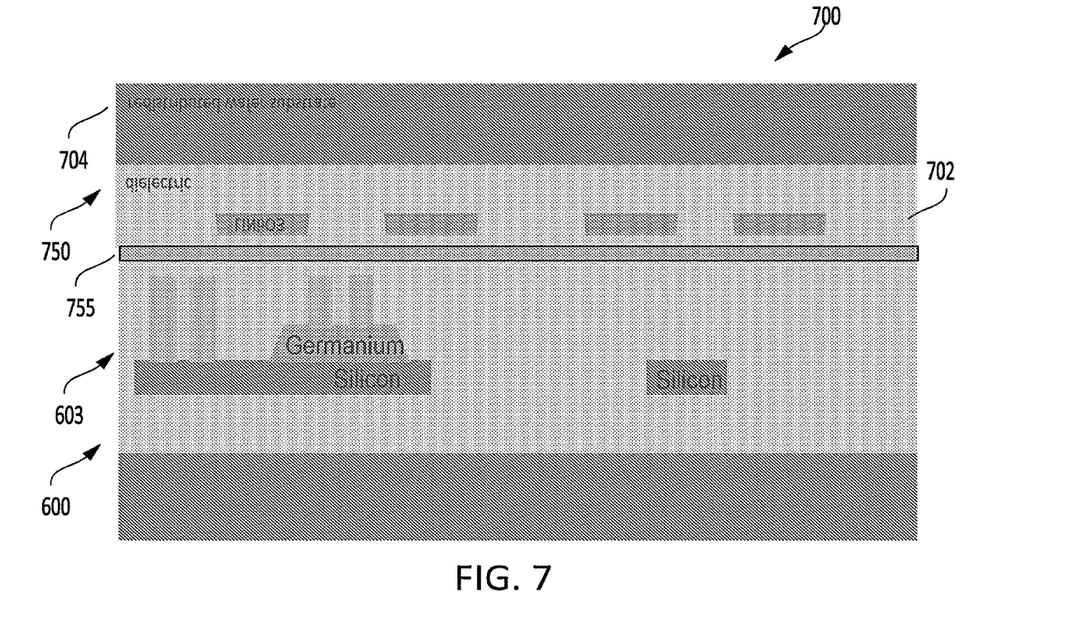
FIG. 7 depicts a sectional view of a first embodiment of a an intermediate process structure, composed of a sacrificial wafer bonded to a photonic device wafer, according to an exemplary embodiment of the disclosure.

FIG. 7 depicts a photonic device structure 700 composed of sacrificial wafer 750 bonded to a photonic device wafer 600 at bonding layer 755 between the two. Sacrificial wafer 750 may include sacrificial wafer substrate 704 and sacrificial wafer dielectric matrix 702. Each of the electro-optical material strips in sacrificial wafer 750 may be placed proximate to one or more photonic device dies 603 in photonic device wafer 600. In this manner, the electro-optical material strips may be optically coupled to the one or more photonic device dies 603. In one aspect, the vertical separation between electro-optical material strips and another waveguide on the device die 603 is less than 3 micrometers. In another aspect, it is less than 1 micrometer. In another aspect, it is less than 0.5 micrometer. It may be recognized that although sacrificial wafer 750 may have a structure as depicted in FIG. 3A, any of the sacrificial wafers containing electro-optical material as depicted in FIGS. 3B-3I may be used. As depicted in FIG. 7, photonic device wafer 600 may be oriented to have electrodes 645 (see FIG. 6) directed towards bonding layer 755. FIG. 9, described below, illustrates an alternative photonic device structure 900 in which electrodes 645 are directed opposite to bonding layer 755. This orientation of the alternative photonic device wafer with respect to sacrificial wafer 750 may be considered a reversed or flipped photonic device wafer (see 865, FIG. 8D).

Figure 8A:
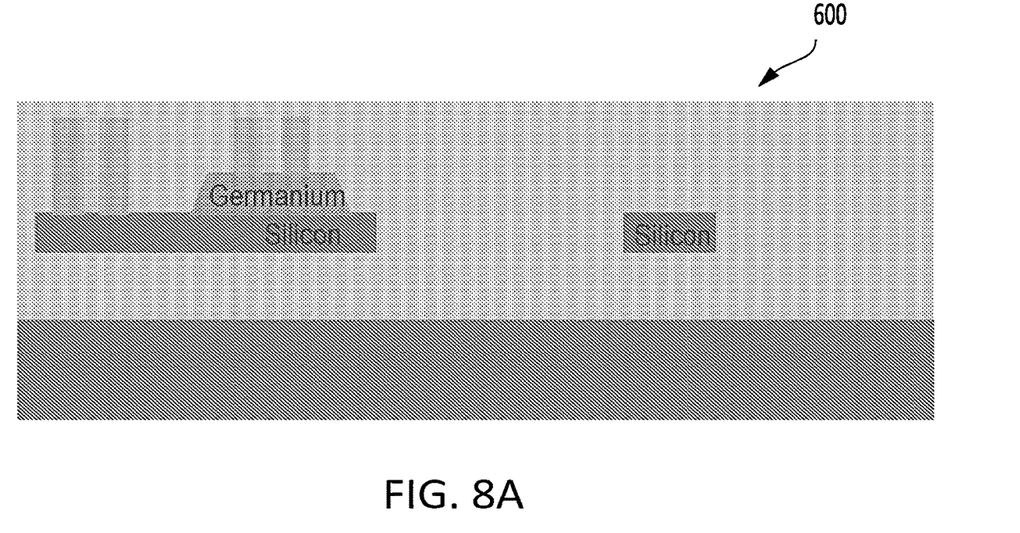
FIG. 8A-FIG. 8D depict process steps for fabricating a second embodiment of a wafer composed of photonic device dies, according to an exemplary embodiment of the disclosure.
Figure 8B:
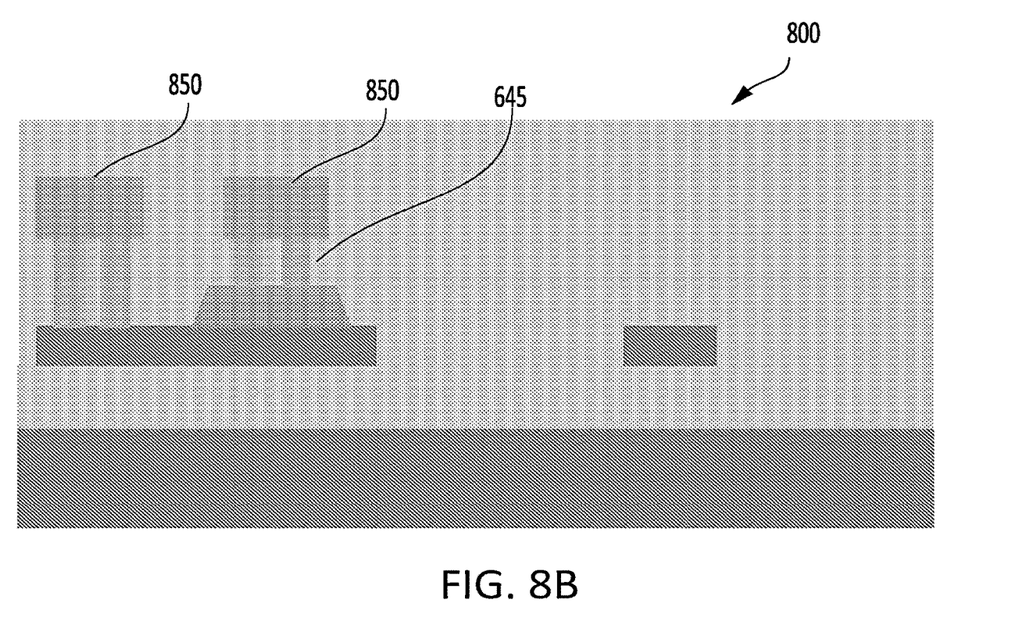
Figure 8C:
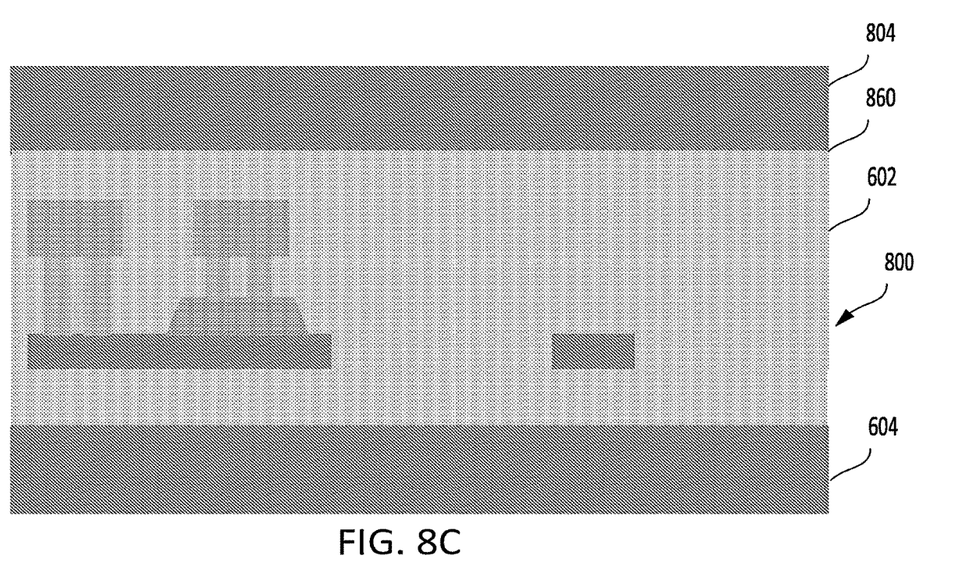
Figure 8D:
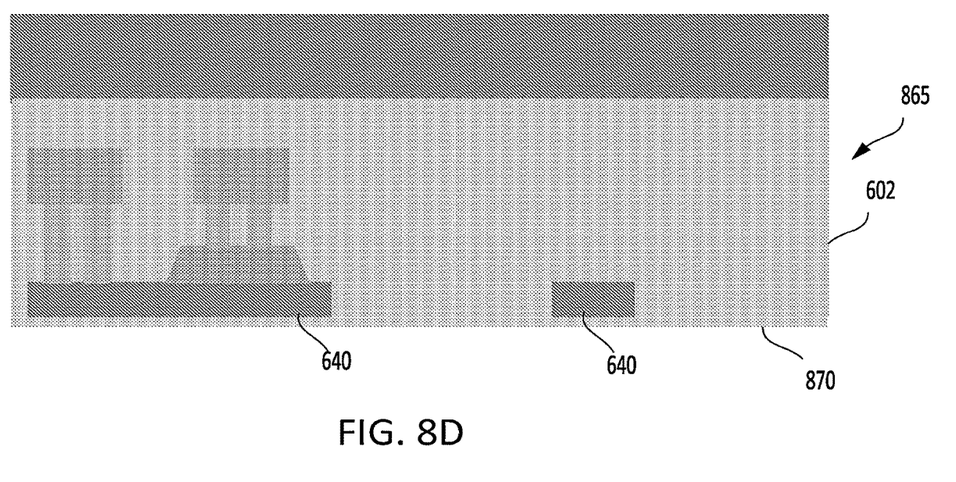
Figure 9:
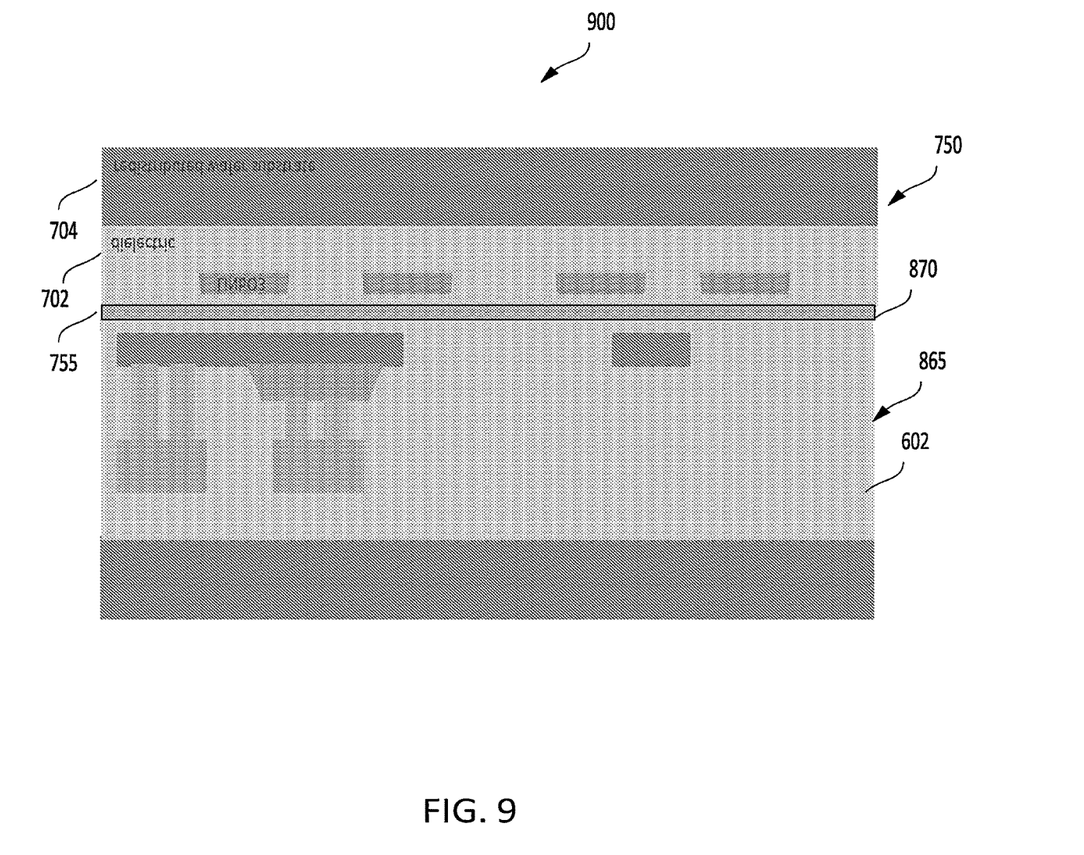
FIG. 9 depicts a sectional view of a second embodiment of an intermediate process structure, composed of a sacrificial wafer bonded to the photonic device wafer depicted in FIG. 8D, according to an exemplary embodiment of the disclosure.

FIGS. 8A-8D depict a method of fabricating a reversed or flipped photonic device wafer as depicted in FIG. 8D. FIG. 8A again illustrates photonic device wafer 600 as depicted in FIG. 6. Additional metallization layers 850 may be added to contact electrodes 645 resulting in metalized photonic device wafer 800, as illustrated in FIG. 8B. As depicted in FIG. 8C, after the additional metallization process, photonic device wafer 800 can be flipped and bonded to another handle substrate 804 with dielectric layer 860. FIG. 8D illustrates reversed or flipped photonic device wafer 865 fabricated by the removal of original substrate 604 of photonic device wafer 600. The removal of original substrate 604 of photonic device wafer 600 thereby exposes a lower surface 870 of dielectric layer 602 of photonic device wafer 600. Original substrate 604 of photonic device wafer 600 may be removed using any effective process including, without limitation, etching, polishing, or other similar technique. The dielectric material 602 can be etched or polished to have a desired thickness above the silicon waveguide 640. In some aspects, one can deposit additional dielectric waveguide material, pattern the waveguide material, deposit dielectric cladding material over the extra waveguide material and dielectric layer 602, and planarize the surface. Such additional dielectric waveguide can be made of SiN, SiON, or silicon, and can be used in connection with the electro-optical material strips that will be placed above.

FIG. 9 illustrates alternative photonic device structure 900 composed of sacrificial wafer 750 bonded to reversed or flipped photonic device wafer 865. Sacrificial wafer 750 may be bonded to reversed or flipped photonic device wafer 865 at lower surface 870 of the dielectric layer 602 of flipped photonic device wafer 865 at bonding layer 755.

It may be understood that sacrificial wafer substrate 704 may be removed from photonic device structure 700 or alternative photonic device structure 900 to exposes sacrificial wafer dielectric matrix 702. Exposed sacrificial wafer dielectric matrix 702 may be further etched, patterned, or planarized in order to produce a final photonic device structure. Such additional processing steps may be used to fabricate electrical connections to the devices embedded below the dielectric matrix. The final structure may be cut or cleave to result in individual photonic chips composed of electro-optical material strips overlaid on active photonic devices.

Having thus described several aspects and embodiments of the technology of this application, it is to be appreciated that various alterations, modifications, and improvements will readily occur to those of ordinary skill in the art. Such alterations, modifications, and improvements are intended to be within the scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within +20% of a target value in some embodiments, within ±10% of a target value in some embodiments, within ±5% of a target value in some embodiments, and yet within ±2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

Where a range or list of values is provided, each intervening value between the upper and lower limits of that range or list of values is individually contemplated and is encompassed within the disclosure as if each value were specifically enumerated herein. In addition, smaller ranges between and including the upper and lower limits of a given range are contemplated and encompassed within the disclosure. The listing of exemplary values or ranges is not a disclaimer of other values or ranges between and including the upper and lower limits of a given range.

The use of headings and sections in the application is not meant to limit the disclosure; each section can apply to any aspect, embodiment, or feature of the disclosure. Only those claims which use the words "means for" are intended to be interpreted under 35 USC 112(f). Absent a recital of "means for" in the claims, such claims should not be construed under 35 USC 112. Limitations from the specification are not intended to be read into any claims, unless such limitations are expressly included in the claims.

What is claimed is:

1. A method comprising:
   providing a sacrificial wafer, comprising a substrate and an electro-optical material strip disposed within a dielectric matrix deposited over the substrate;
   contacting the sacrificial wafer to a photonic device wafer, wherein the photonic device wafer comprises a photonic device die, and
   wherein the electro-optical material strip is disposed proximate to the photonic device die; and
   bonding the sacrificial wafer to the photonic device wafer.

2. The method of claim 1, wherein the electro-optical material strip comprises essentially $LiNbO_3$.

3. The method of claim 1, wherein the electro-optical material strip comprises essentially $BaTiO_3$.

4. The method of claim 1, wherein providing the sacrificial wafer comprises:
   placing an electro-optical material chiplet on a dielectric layer of the sacrificial wafer;
   bonding the electro-optical material chiplet to the dielectric layer of the sacrificial wafer;
   fabricating an electro-optical material strip from the electro-optical material chiplet;
   depositing a second dielectric layer over the sacrificial wafer and the electro-optical material strip, thereby embedding the electro-optical material strip in the dielectric matrix; and
   planarizing the dielectric matrix of the sacrificial wafer.

5. The method of claim 4, wherein placing the electro-optical material chiplet on the dielectric layer of the sacrificial wafer comprises using a pick-and-place device or a wafer bonding device.

6. The method of claim 4, wherein the electro-optical material chiplet, comprises an electrooptical material thin film deposited over a chiplet dielectric layer disposed over a chiplet substrate.

7. The method of claim 6, wherein placing the electro-optical material chiplet on the dielectric layer of the sacrificial wafer comprises placing the electro-optical material thin film of the electro-optical material chiplet on the dielectric layer of the sacrificial wafer.

8. The method of claim 7, further comprising:
   removing the chiplet substrate; and
   etching the electro-optical material thin film thereby forming the electro-optical material strip.

9. The method of claim 4, wherein placing the electro-optical material chiplet on the dielectric layer of the sacrificial wafer comprises placing an electro-optical material die on the dielectric layer of the sacrificial wafer.

10. The method of claim 9, wherein the electro-optical material die comprises a thick electrooptical material film, an electro-optical material thin film, and a pre-implanted damage layer therebetween, and
    wherein placing the electro-optical material die on the dielectric layer of the sacrificial wafer comprises placing the electro-optical material thin film on the dielectric layer of the sacrificial wafer.

11. The method of claim 10 further comprising:
    cleaving the electro-optical material die to remove the thick electro-optical material film; and
    etching the electro-optical material thin film thereby forming the electro-optical material strip.

12. The method of claim 1, wherein the sacrificial wafer further comprises an optical waveguide disposed proximate to the electro-optical material strip.

13. The method of claim 12, wherein providing the sacrificial wafer comprises:
    depositing an optical waveguide material above a dielectric layer of the sacrificial wafer, wherein the dielectric layer of the sacrificial wafer is disposed over the substrate;
    patterning the optical waveguide material thereby fabricating the optical waveguide;
    depositing an additional dielectric layer over the optical waveguide and the dielectric layer of the sacrificial wafer;
    planarizing a surface of the additional dielectric layer;
    placing an electro-optical material chiplet on the planarized surface of the sacrificial wafer proximate to the optical waveguide; and
    bonding the electro-optical material chiplet to the planarized surface of the sacrificial wafer.

14. The method of claim 1, wherein the sacrificial wafer further comprises an electrode disposed proximate to the electro-optical material strip.

15. The method of claim 14, wherein providing the sacrificial wafer comprises:
    pattern etching a dielectric layer of the sacrificial wafer, wherein the dielectric layer of the sacrificial wafer is disposed over the substrate;
    depositing an electrode material in the etched pattern of the dielectric layer of the sacrificial wafer;
    planarizing a surface comprising the electrode material in the etched pattern and the dielectric layer of the sacrificial wafer;
    depositing an additional dielectric layer over the electrode material in the etched pattern and the dielectric layer;
    placing an electro-optical material chiplet on the additional dielectric layer proximate to the electrode material in the etched pattern; and
    bonding the electro-optical material chiplet to the additional dielectric layer.

16. The method of claim 1, further comprising removing the substrate, thereby exposing a bottom surface of the dielectric matrix of the sacrificial wafer.

17. A photonic device structure, comprising:
    a photonic device wafer, comprising:
       a device wafer substrate; and
       a photonic device die fabricated in a device wafer dielectric layer disposed over the device wafer substrate; and
    a sacrificial wafer, comprising:
       a sacrificial wafer substrate; and
       an electro-optical material strip, wherein the electro-optical material strip is embedded in a sacrificial wafer dielectric matrix,
       wherein the sacrificial wafer dielectric matrix is bonded to the device wafer dielectric layer, and
       wherein the electro-optical material strip is disposed proximate to the photonic device die.

18. The photonic device structure of claim 17, wherein the electro-optical material strip comprises essentially $LiNbO_3$.

19. The photonic device structure of claim 17, wherein the electro-optical material strip comprises essentially $BaTiO_3$.

20. The photonic device structure of claim 17, wherein the electro-optical material strip is 200 nm to 600 nm thick.

21. The photonic device structure of claim 17, wherein the sacrificial wafer further comprises an electrode proximate to the electro-optical material strip.

22. The photonic device structure of claim 17, wherein the sacrificial wafer further comprises an optical waveguide proximate to the electro-optical material strip.

* * * * *